J. H. MERRILL.
Breech-Loading Fire-Arm.
No. { 51, / 1,156. }
Reissued Mar. 26, 1861.
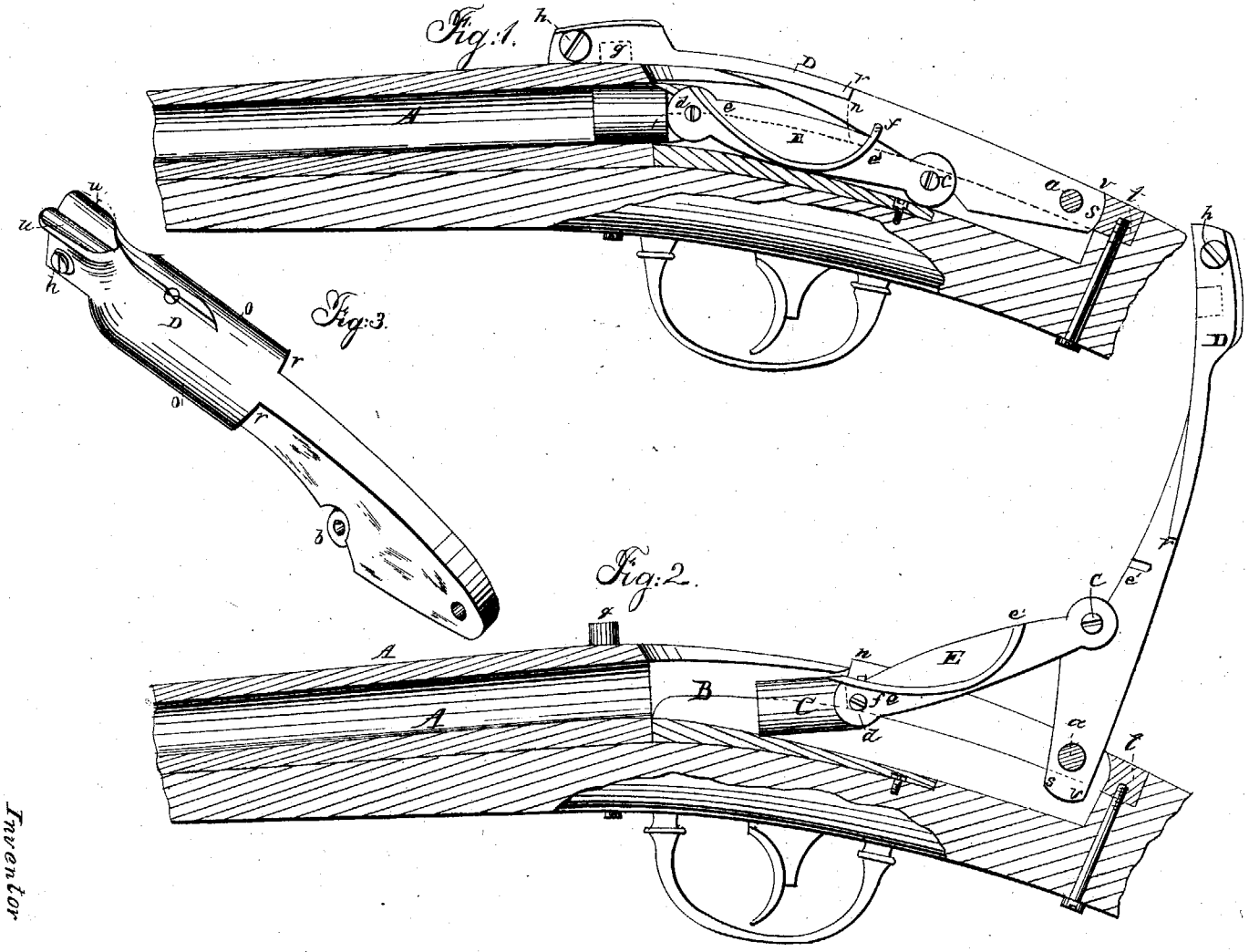
Witnesses
E Cohen
M Gitkner
Inventor
James H Merrill
By atty A B Stoughton
N. PETERS, PHOTO-LITHOGRAPHER, WASHINGTON, D. C.

UNITED STATES PATENT OFFICE.

THE MERRILL PATENT FIRE ARM MANUFACTURING COMPANY, OF BALTIMORE, MARYLAND, ASSIGNEE OF JAMES H. MERRILL.

IMPROVEMENT IN FIRE-ARMS.

Specification forming part of Letters Patent No. 20,954, dated July 20, 1858; Reissue No. 1,156, dated March 26, 1861.

DIVISION A.

*To all whom it may concern:*

Be it known that JAMES H. MERRILL, of the city of Baltimore and State of Maryland, did invent certain new and useful Improvements in Breech-Loading Fire-Arms; and the following is a full, clear, and exact description of said MERRILL'S invention, reference being had to the accompanying drawings, making a part of this specification, in which—

Figure 1 represents a longitudinal vertical section through a portion of the gun with the breech closed. Fig. 2 represents a similar section showing the breech pin or plug as drawn back to open the breech. Fig. 3 represents in perspective the lever by which the breech pin or plug is operated.

The value of a breech-loading fire-arm depends as much upon the simplicity of its parts, having due regard to strength, as upon its capabilities of great range, for unless it is easily handled and kept in order, however great its virtues for a long range may be, it will not go into general use. Where simplicity of parts, strength, and range can be united in one piece, of course the value of the arm is correspondingly increased.

The object of this invention is to divest the gun of the mutiplicity of parts heretofore used in breech-loading fire-arms to make it strong and reliable, efficient as a shooter, within the control of any one, however inexperienced he may be, readily cleansed and kept in order, and very easily loaded and discharged; and the invention consists in combining with an open-breech barrel and an open chamber behind it a plug and system of levers for operating and holding said plug rigidly against the recoil when the gun is discharged, as will be hereinafter explained in connection with the drawings.

A represents the barrel of a gun which is open at its rear end, so as to receive a loaded cartridge therein. In rear of the barrel there is a chamber, B, which, when the gun is to be charged and the piston C drawn back for that purpose, is open and uncovered at the top, and long enough to contain the piston and to receive and hold a loaded cartridge between the rear of the barrel and the front of said piston. When the cartridge is dropped into the chamber B, and the lever D is brought down, as shown in Fig. 1, the chamber B is covered or closed by said lever lying over the top thereof, and the act of bringing down said lever drives the piston C, with the cartridge in advance of it, into the bore of the gun, as shown in said Fig. 1, said piston closing up the rear end of the bore of the gun and acting as a breech pin or plug to the bore.

The several parts are connected and operate as follows: The lever D is pivoted at *a* to the metal casing that incloses the sides of the chamber B. To a lug, *b*, on said lever is pivoted, as at *c*, one end of a toggle arm or lever, E, the other end thereof being pivoted at *d* to the rear end of the piston or plug C, so that by working the lever D on its pivot the piston is run backward and forward into the chamber B, and then through said chamber into the bore of the gun.

Without some means of guiding the arm or lever E the piston or plug C would catch or cramp in its movements to and fro, or not fairly enter the bore of the gun without bruising or battering itself or the bore of the barrel, which it must closely fit and tightly close. To prevent any such liability he arranged and constructed as follows: In the side or sides of the arm E, as also for a short distance into the lever D, he cut a curved groove, *e e'*, which receives a stud or pin, *f*, rigidly fixed in the casing that incloses the chamber B, and this stud or pin guides the arm E by allowing its forward portion, at the first of its movement, to travel in a more direct line, thus pushing the plug straight toward the bore; but toward the last of its movement the curved groove *e'* becomes more abrupt and draws down the rear portion of said toggle-arm E, thus allowing the piston or plug C and the arm E to come into a more direct line with each other and with the bore of the barrel, and allow the plug to enter the bore more freely without cramping, binding, or chafing of the edges or ends of said plug and barrel. When the piston is drawn back to its full extent, its rear portion passes under a shoulder or overhanging portion of the casing at the sides of the chamber, and it is thus prevented from rising up or swinging out of said chamber.

The lock, hammer, stock, and sights, and other of the usual accompaniments of a fire-arm, may be made in any of the known ways. The lever D is slightly curved, so as to snugly fit down over the stock of the gun, and is widened out at *o*, to cover the wider portion of the chamber B—viz., that portion into which the cartridge is dropped. It has, moreover, shoulders at *r r*, which, when the lever is shut down, come against corresponding shoulders, *n*, in the casing. Its rear end, *s*, is rounded off, so as to move and snugly fit against a rounded seat, *t*, in the casing. Its front end at *u* is spread out or countersunk to admit of sighting the gun. A catch-piece, *g*, is secured to the barrel, upon which the end of the lever D, when it is brought down, catches and is held by a spring hook or lock, so that when the lever is down, as shown in Fig. 1, and locked at its forward end, it affords several points of resistance against the recoil of the explosion of the charge in the gun. In the first place the pivoted points *d c a* are nearly in line with the plug C, and hence are in the best position to resist the recoil; secondly, the lever D is locked down at its forward end, its shoulders *r r* fit snugly against the shoulders *n* in the casing, and finally its rear portion, *s*, rests against the solid portion *t* in the stock, and has thus three resisting-points to present to prevent its yielding to the recoil. When the gun has been discharged and is to be reloaded, the thumb is pressed upon the spring-catch *h*, which unlocks the lever. The lever is thrown back into the position shown in Fig. 2, which so opens up the breech that the operator can with his thumb and finger enter the cartridge into the bore of the gun, and by bringing down the lever again the ball-cartridge is driven into the barrel.

It will be perceived that the grooves *e e'* are continued clear into the lever D, so as to let the parts come well down into the chamber and snugly close them in the chamber without leaving any projections to interfere with the grasp of the user at that point.

The space between the rear end of the barrel and the front end of the piston or plug, when the plug is drawn back, is sufficient to contain the cartridge, and the user, by holding the gun in a horizontal position, can drop the cartridge immediately into said space without actually inserting the cartridge point foremost into its position, as is generally, if not universally, the case with breech-loading cartridge-guns, and which is very inconvenient on horse-back, or when the fingers are benumbed with cold. By opening up this space behind the rear of the barrel the user finds a place to drop the cartridge into, instead of searching for it, where it must be carefully inserted point foremost.

The corner *v* of the lever D in moving against the curved plate *t* scrapes off all dirt, &c., and allows the lever to come down snug without jamming.

Having thus fully described this invention, what is claimed under this patent as the invention of JAMES H. MERRILL is—

The combination of a barrel that opens out at its top, and an open chamber behind it for receiving a cartridge, with a breech pin or plug, and two levers for actuating and holding it locked, substantially as herein described.

THE MERRILL PATENT FIRE ARMS MANUFACTURING COMPANY.
By JAMES H. MERRILL,
*Their President.*

Witnesses:
JOHN M. FRIEDRICH,
MAJ. T. SPARKS.